US012808453B2

(12) United States Patent
Kobayashi

(10) Patent No.: US 12,808,453 B2
(45) Date of Patent: Nov. 24, 2026

(54) SOLENOID VALVE

(71) Applicant: AISAN KOGYO KABUSHIKI KAISHA, Obu (JP)

(72) Inventor: Hiroki Kobayashi, Miyoshi (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 0 days.

(21) Appl. No.: 18/850,655

(22) PCT Filed: Mar. 6, 2023

(86) PCT No.: PCT/JP2023/008321
§ 371 (c)(1),
(2) Date: Sep. 25, 2024

(87) PCT Pub. No.: WO2023/203898
PCT Pub. Date: Oct. 26, 2023

(65) Prior Publication Data

US 2025/0215995 A1 Jul. 3, 2025

(30) Foreign Application Priority Data

Apr. 21, 2022 (JP) ................................ 2022-069970

(51) Int. Cl.
*F16K 31/06* (2006.01)
*F16K 25/00* (2006.01)
(Continued)

(52) U.S. Cl.
CPC .......... *F16K 31/0675* (2013.01); *F16K 25/00* (2013.01); *F16K 31/0651* (2013.01);
(Continued)

(58) Field of Classification Search
CPC ............ F16K 31/0651; F16K 31/0675; F16K 31/0655; F16K 31/06; H01F 2007/086; H01F 7/16; H01F 7/1607
(Continued)

(56) References Cited

U.S. PATENT DOCUMENTS 3,325,139 A * 6/1967 Diener ................. H01F 7/1638
335/262
3,371,684 A * 3/1968 Tissot-Dupont .... F16K 31/0651
137/595
(Continued)

FOREIGN PATENT DOCUMENTS

DE 10 2009 007 118 A1 8/2010
JP 2010-267749 A 11/2010
(Continued)

OTHER PUBLICATIONS

May 23, 2023 Search Report issued in International Patent Application No. PCT/JP2023/008321.
(Continued)

*Primary Examiner* — Matthew W Jellett
(74) *Attorney, Agent, or Firm* — Oliff PLC

(57) ABSTRACT

This solenoid valve includes: a coil; a stator core having a bore; a valve which is disposed in the bore; and has sliding parts disposed on the outer circumferential thereof; and slid parts which are disposed on the inner circumference of the bore and on which the sliding parts of the valve slide when the valve reciprocates. The solenoid valve is configured so that the stator core suctions the valve by means of magnetic force generated in the coil. One portion of the outer circumference of the valve forms a magnetic circuit between the portion and the stator core and the other portions of the outer circumference of the valve, which do not form the magnetic circuit, serve as the sliding parts.

1 Claim, 8 Drawing Sheets

(51) Int. Cl.
*H01F 7/16* (2006.01)
*H01F 7/08* (2006.01)

(52) U.S. Cl.
CPC ....... *F16K 31/0655* (2013.01); *H01F 7/1607* (2013.01); *H01F 2007/086* (2013.01)

(58) Field of Classification Search
USPC ...................................................... 251/129.21
See application file for complete search history.

(56) References Cited

U.S. PATENT DOCUMENTS 4,336,896 A * 6/1982 Lunau .................. B67D 1/1466 222/504
5,114,116 A * 5/1992 Muller .................. B60T 15/028 251/129.21
5,704,553 A * 1/1998 Wieczorek ............. F02M 61/12 251/129.21
5,957,161 A * 9/1999 Erickson ............. F16K 31/0613 251/129.21
6,484,700 B1 * 11/2002 Kimmel ............... F02M 61/042 239/408
6,553,975 B2 * 4/2003 Weldon .............. F02M 25/0836 123/518
6,811,135 B2 * 11/2004 Moreno .............. F16K 31/0651 251/129.21
6,863,255 B2 * 3/2005 Watanabe ........... F16K 31/0655 251/282
7,588,229 B2 * 9/2009 Eiser ....................... B60T 8/363 335/229
7,825,758 B2 * 11/2010 Bamber .............. F16K 31/0655 335/262
7,973,627 B2 * 7/2011 Yamagata ............. H01F 7/1607 335/297
8,579,254 B2 * 11/2013 Buse ..................... H01F 7/1607 251/336
8,585,014 B2 * 11/2013 Oikawa ............... F16K 11/0716 251/129.15
9,217,511 B2 * 12/2015 Williams ............ F16K 31/0655
9,556,968 B2 * 1/2017 Mayr .................. F16K 31/0634
9,739,394 B2 * 8/2017 Fujita .................. F16K 31/0613
9,856,992 B2 * 1/2018 Hironaka ................ F16K 31/06
10,139,004 B2 * 11/2018 Hironaka ............ F16K 31/0668
10,145,488 B2 * 12/2018 Fujita .................. F16K 31/0675
10,309,547 B2 * 6/2019 Fukunaga ........... F16K 31/0675
10,388,446 B2 * 8/2019 Ott ....................... F16K 31/0675
11,242,939 B2 * 2/2022 Magel ................. F16K 31/0675
11,421,562 B2 * 8/2022 Schatz ................ F16K 31/0689
12,435,809 B2 * 10/2025 Moosmann ......... F16K 31/0675
2002/0101314 A1 * 8/2002 Oishi .................. F16K 31/0613 335/256
2006/0017535 A1 * 1/2006 Nagasaki .................. H01F 7/13 335/220
2006/0231785 A1 * 10/2006 Hans .................. F02M 21/0266 251/129.21
2008/0245427 A1 * 10/2008 Williams ............ F16K 31/0627 137/625.25
2011/0115587 A1 * 5/2011 Ishibashi ................. H01F 7/081 335/255
2018/0202572 A1 * 7/2018 Waterstredt ......... F16H 61/0251

FOREIGN PATENT DOCUMENTS

JP 2011-108781 A 6/2011
JP 2013-038233 A 2/2013
JP 2013-168425 A 8/2013

OTHER PUBLICATIONS

Oct. 8, 2024 International Preliminary Report on Patentability issued in International Patent Application No. PCT/JP2023/008321.

* cited by examiner

SOLENOID VALVE

CROSS-REFERENCE TO RELATED APPLICATIONS

This is a national phase application filed under 35 U.S.C. 371 of PCT/JP2023/008321 filed on Mar. 6, 2023, which claims the benefit of priority from the prior Japanese Patent Application No. 2022-069970 filed on Apr. 21, 2022, the entire contents of all of which are incorporated herein by reference.

TECHNICAL FIELD

The technique disclosed in this description relates to a solenoid valve configured such that a stator core sucks a valve in an axial direction by a magnetic force generated in a coil for reciprocally moving the valve.

BACKGROUND ART

Heretofore, as this type of technique, for example, a "linear solenoid" described in the Patent Literature 1 indicated below has been known. This solenoid valve is provided with a coil generating the magnetic force by energization, a plunger supported slidably in an axial direction, a stator core having a slide hole inside thereof, and a shaft for transmitting a suction force generated in the plunger to an outside of the stator core. The stator core is a core integrally formed of a magnetism-attraction core for sucking the plunger to the axial direction by the magnetic force generated in the coil, a magnetism-delivery core for passing and receiving the magnetism with the plunger in a radial direction, and a first magnetism block portion for inhibiting direct magnetic-flux coupling of the magnetism-attraction core and the magnetism-delivery core. In this linear solenoid, the plunger and the shaft are integrally formed via a magnetism-coupling inhibiting member to inhibit the direct magnetic-flux coupling of the plunger and the shaft. On an outer peripheral surface of the plunger, a first protruding portion protruding in an outer radial direction is provided. Further, on an outer peripheral surface of the shaft, a second protruding portion protruding in the outer radial direction is provided. The first protruding portion and the second protruding portion are to directly slide along an inner peripheral surface of the slide hole of the stator core.

RELATED ART DOCUMENTS

Patent Documents

Patent Document 1: Japanese unexamined patent application publication No. 2013-168425

SUMMARY OF INVENTION

Problems to be Solved by the Invention

The above-mentioned linear solenoid is configured such that the protruding portions slide in the slide holes of the stator core at two positions with less influence of a side force caused by the magnetic force, but one of the two positions is located at a position held by areas of generating the side force, and thus there is less effect of lowering the hysteresis. Herein, in order to restrain the hysteresis in the linear solenoid, it is effective to reduce the side force by sliding with a non-magnetic material for lowering a sliding resistance. For example, a configuration of direct sliding of the plunger and the stator core, not sliding with the shaft, can achieve reduction in size of the linear solenoid. However, non-magnetic plating or non-magnetic member needs to be added for sliding with the non-magnetic material. Further, the sliding is not performed completely by the non-magnetic material in case of sliding at a position with less magnetic flux like the above-mentioned linear solenoid, and thus it is considered that effect of lowering the hysteresis is small.

This disclosed technique has been made in view of the above circumstances and has a purpose of achieving effective reduction in a hysteresis in working of a solenoid valve that is configured such that a stator core sucks a valve in an axial direction by a magnetic force generated by a coil.

MEANS OF SOLVING THE PROBLEMS (1) In order to achieve the above purpose, an aspect of the present invention has a feature that a solenoid valve comprises a coil generating a magnetic force by energization; a stator core provided with the coil on an outside and a bore on an inside; a valve that is placed reciprocally movably in an axial direction in the bore and is provided on its outer periphery with a sliding part; and a slid part that is placed on an inner periphery of the bore and is configured to slide with the sliding part of the valve when the valve reciprocally moves. The solenoid valve is configured that the stator core sucks the valve in the axial direction by a magnetic force generated by the coil to reciprocally moves the valve, wherein a part of the outer periphery of the valve forms a magnetic circuit with the stator core, and another part of the outer periphery of the valve, which forms no magnetic circuit, constitutes the sliding part.

According to the configuration of the above (1), the valve is placed reciprocally movably in the axial direction in the bore of the stator core, the sliding part is placed on the outer periphery of the valve, and the slid part, along which the sliding part of the valve slides during reciprocal moving of the valve, is placed on the inner periphery of the bore. Herein, a part of the outer periphery of the valve forms the magnetic circuit with the stator core, and the other part of the outer periphery of the valve that does not form the magnetic circuit constitutes the sliding part. Accordingly, when the valve reciprocally moves in the bore of the stator core, the sliding part of the valve slides with the corresponding slid part of the bore. The sliding part is placed on the outer periphery of the valve where does not form the magnetic circuit, and thus the side force generated by the magnetic force acting on the valve becomes small.

(2) To achieve the above purpose, in the configuration of the above (1), preferably, at least any one of the sliding part and the slid part is formed of non-magnetic material.

According to the configuration of the above (2), in addition to the operation of the above configuration (1), at least any one of the sliding part and the slid part is formed of the non-magnetic material, and accordingly, the magnetic circuit is not formed between the sliding part and the slid part. Therefore, the side force generated by the magnetic force acting on the valve can be made further smaller.

(3) In order to achieve the above purpose, in the configuration of the above (1) or (2), preferably the valve includes an end portion, and the sliding part not forming the magnetic circuit is placed on an outer periphery of the end portion, a valve seat, on which the valve is configured to be seated, is placed at a position facing the end portion of the valve, and the slid part is configured by a non-magnetic sleeve integrally formed with the valve seat.

According to the configuration of the above (3), in addition to the operation of the above configuration (1) or (2), the slid part sliding with the sliding part of the valve is configured by the non-magnetic sleeve that is integrally formed with the valve seat, and accordingly, the valve seat is utilized for providing the non-magnetic slid part. Further, the reciprocal motion of the valve with respect to the valve seat is guided by the sleeve.

(4) In order to achieve the above purpose, in the configuration of the above (1) or (2), preferably, the valve includes an end portion, and the sliding part not forming the magnetic circuit is placed on an outer periphery of the end portion, and the slid part is configured by a non-magnetic ring that is formed separately from the stator core.

According to the configuration of the above (4), in addition to the operation of the above configuration (1) or (2), the non-magnetic slid part is provided in the stator core by the ring, and thus the magnetic circuit is not formed between the slid part and the sliding part. Therefore, the side force generated by the magnetic force acting on the valve is made further smaller.

(5) To achieve the above purpose, in the configuration of the above (1) or (2), preferably, the valve includes an end portion, and the sliding part is placed on an outer periphery of the end portion, and the sliding part is configured by a non-magnetic ring that is formed separately from the valve.

According to the configuration of the above (5), in addition to the operation of the above configuration (1) or (2), the sliding part is configured by the non-magnetic ring formed separately from the valve, and thus the magnetic circuit is not formed between the sliding part and the slid part. Therefore, the side force caused by the magnetic force acting on the valve is made further smaller.

(6) In order to achieve the above purpose, in the above configuration (1) or (2), preferably, the valve includes an end portion, and the sliding part not forming the magnetic circuit is placed on an outer periphery of the end portion, and the sliding part is configured by a protruding portion protruding to the slid part.

According to the configuration of the above (6), in addition to the operation of the above (1) or (2), the sliding part is configured by the protruding portion, and thus a contact area of the sliding part with respect to the slid part becomes small.

(7) To achieve the above purpose, in the above configuration (1) or (2), preferably, the valve includes an end portion, and the sliding part not forming the magnetic circuit is placed on an outer periphery of the end portion, and the slid part is configured by a protruding portion protruding to the sliding part.

According to the configuration of the above (7), in addition to the above configuration (1) or (2), the slid part is configured by the protruding portion, and thus the contact area of the slid part with respect to the sliding part becomes small.

Effects of the Invention

According to the configuration in the above (1), the solenoid valve is configured such that the stator core sucks the valve in the axial direction by the magnetic force generated in the coil, so that the sliding resistance accompanied with the reciprocal motion of the valve can be lowered, thereby the hysteresis in working of the solenoid valve can be effectively reduced.

According to the configuration in the above (2), in addition to the effect of the above configuration (1), the hysteresis in working of the solenoid valve can be further effectively reduced.

According to the configuration in the above (3), in relation to the effect of the above configuration (1) or (2), the non-magnetic slid part can be provided without increasing the number of components of the solenoid valve, so that the coaxiality accuracy of the valve to the valve seat can be improved.

According to the configuration in the above (4), in relation to the effect of the above configuration (1) or (2), the hysteresis in working of the solenoid valve can be further effectively reduced.

According to the configuration in the above (5), in relation to the effect of the above configuration (1) or (2), the hysteresis in working of the solenoid valve can be further effectively reduced.

According to the configuration in the above (6), in relation to the effect of the above configuration (1) or (2), in the solenoid valve, the sliding resistance of the valve can be further reduced, and the hysteresis in working of the solenoid valve can be further effectively reduced.

According to the configuration in the above (7), in relation to the effect of the above configuration (1) or (2), in the solenoid valve, the sliding resistance of the valve can be further reduced, and the hysteresis in working of the solenoid valve can be further effectively reduced.

MODE FOR CARRYING OUT THE INVENTION

First Embodiment

Hereinafter, a first embodiment embodying a solenoid valve is explained in detail with reference to the accompanying drawings.

(Configuration of Solenoid Valve)

Figure 1:
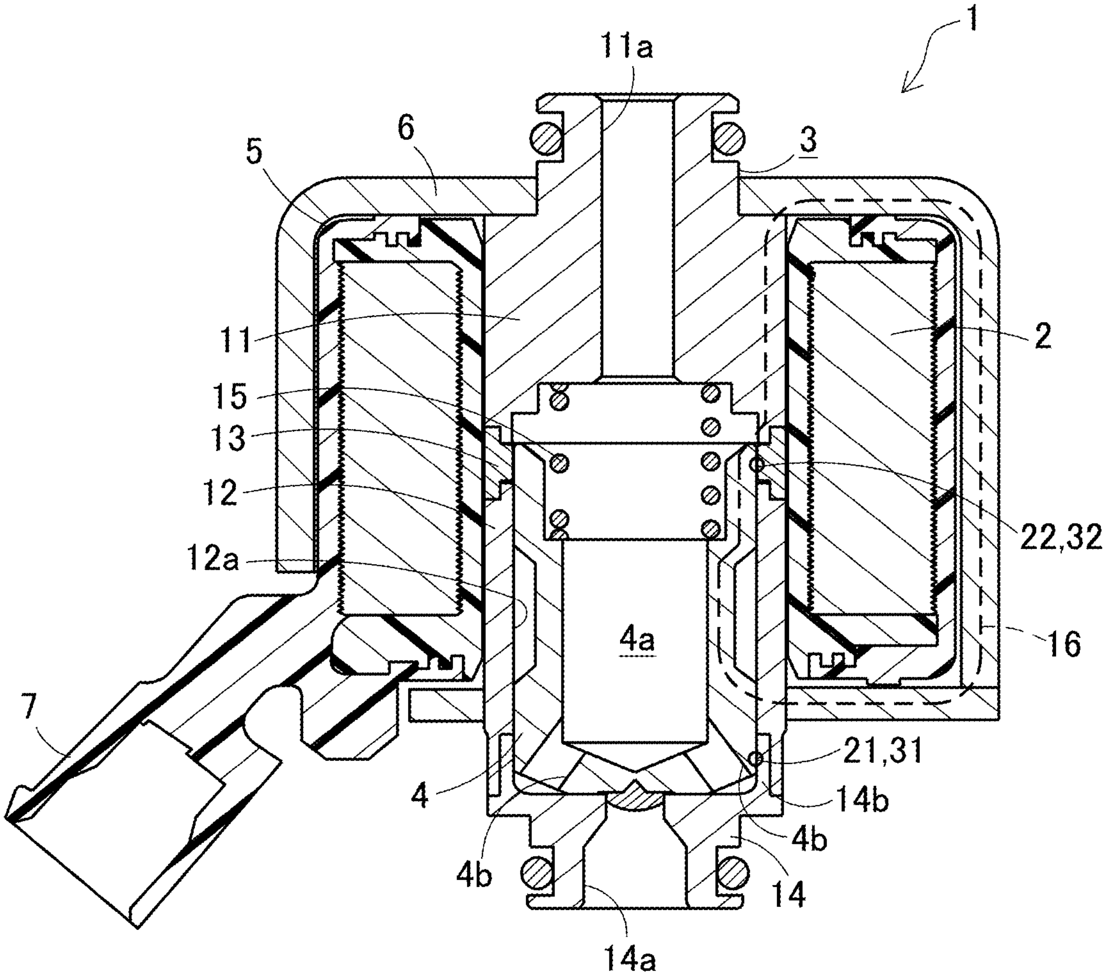
FIG. 1 is a sectional view of a solenoid valve according to a first embodiment.

FIG. 1 is a sectional view of a solenoid valve 1 in this embodiment. This solenoid valve 1 is provided with a coil 2 generating a magnetic force by energization, a stator core 3 of an almost tube-like shape having the coil 2 placed on an outside and a bore 12*a* placed on an inside, a valve 4 of an almost tube-like shape, which is placed reciprocally movably in an axial direction in the bore 12*a* and provided on its outer periphery with sliding parts 21, 22, and slid parts 31, 32 which are placed on an inner periphery of the bore 12*a* and slide with the sliding parts 21, 22 during reciprocal moving of the valve 4. The coil 2 is covered by a resin-made casing 5, and an outside of the casing 5 is covered by a yoke 6 formed of magnetic material. A part of the casing 5 is formed with a connector 7 for power supply.

The stator core 3 is formed of magnetic material and configured with a core body 11 on an upper side in FIG. 1 and a tube-like body 12 extending downward coaxially from the core body 11. The core body 11 includes an inner hole 11*a* extending in its axial direction, and the body 12 includes the bore 12*a* extending in its axial direction. The valve 4 is formed of the magnetic material and includes an inner hole 4*a* and a pore 4*b* penetrating from the inner hole 4*a* to a valve seat 14. A ring 13 formed of non-magnetic material is placed between the core body 11 and the body 12. On a lower end portion of the body 12, the valve seat 14 on which the valve 4 is seated is placed at a position facing a lower end portion of the valve 4. The valve seat 14 includes a valve hole 14*a* and is formed of the non-magnetic material. A spring 15 to urge the valve 4 in a direction to be seated on the valve seat 14 (a valve-closing direction) is provided between an upper end portion of the valve 4 and a lower end portion of the core body 11. This solenoid valve 1 is formed with a magnetic circuit 16 during energization to the coil 2 as indicated with a broken line in FIG. 1 in a portion surrounded by the respective components 4, 6, 11, and 12.

This solenoid valve 1 is configured such that the stator core 3 sucks the valve 4 in the axial direction by the magnetic force generated by the coil 2 for reciprocally moving the valve 4. Specifically, when the solenoid valve 1 is to be opened, the stator core 3 sucks the valve 4 in the axial direction against an urging force of the spring 15 by the magnetic force generated by the coil 2. Thereby, the valve 4 is separated (opened) from the valve seat 14 to open the valve hole 14*a*. In this valve-open state, the valve hole 14*a*, the inner hole 4*a* of the valve 4, and the inner hole 11*a* of the core body 11 are communicated with each other, and thus a fluid flows through the passage. When the solenoid valve 1 is to be closed, generation of the magnetic force by the coil 2 is halted, and suction of the valve 4 by the stator core 3 is recessed. Thus, the valve 4 is brought to be seated on the valve seat 14 (valve closing) by the urging force of the spring 15, and the valve hole 14*a* is closed. This solenoid valve 1 constitutes a linear solenoid in a manner that the valve 4 is made to reciprocally move with respect to the stator core 3.

(Sliding Part and Slid Part)

The solenoid valve 1 of this embodiment has the hysteresis characteristic that displacement in the valve 4 differs in a case of current increase and in another case of current decrease even if the current value with respect to the coil 2 is equal. This hysteresis characteristic is derived from the feature that a sliding resistance between the valve 4 and the body 12 acts in a reverse direction from a moving direction of the valve 4. Accordingly, it is effective for reduction in hysteresis to reduce the sliding resistance of the valve 4 against the body 12. To achieve this, in this embodiment, the sliding parts 21, 22 and the slid parts 31, 32 are prescribed as below in order to reduce the sliding resistance of the valve 4.

Figure 2:
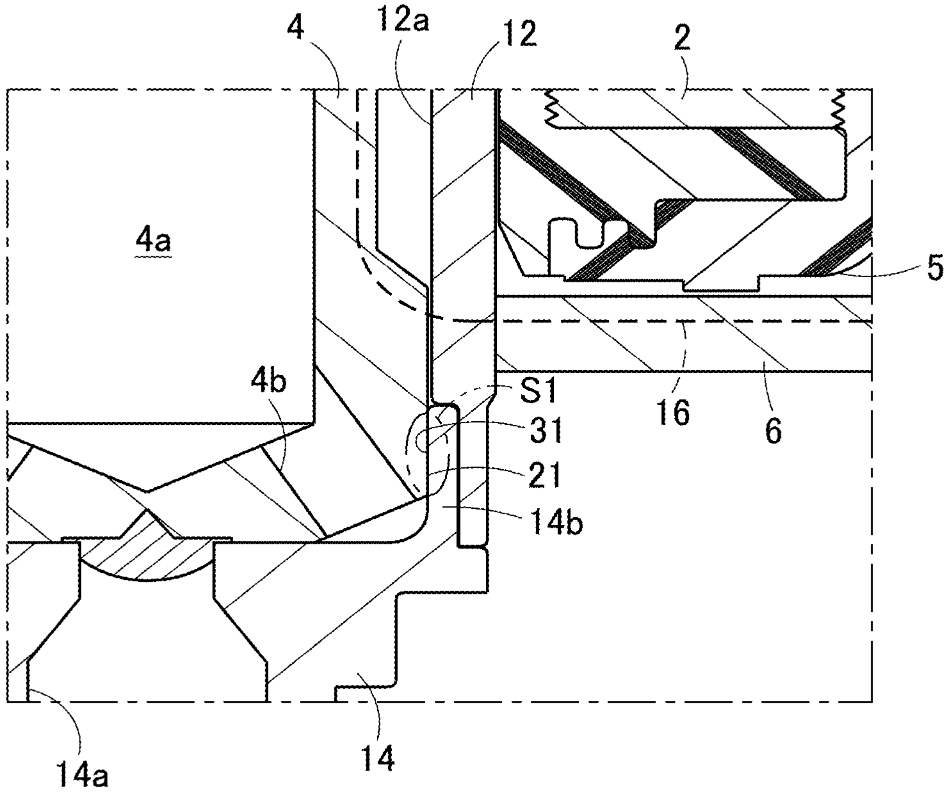
FIG. 2 is an enlarged sectional view of a valve seat and its vicinity in the solenoid valve of FIG. 1 according to the first embodiment.
Figure 3:
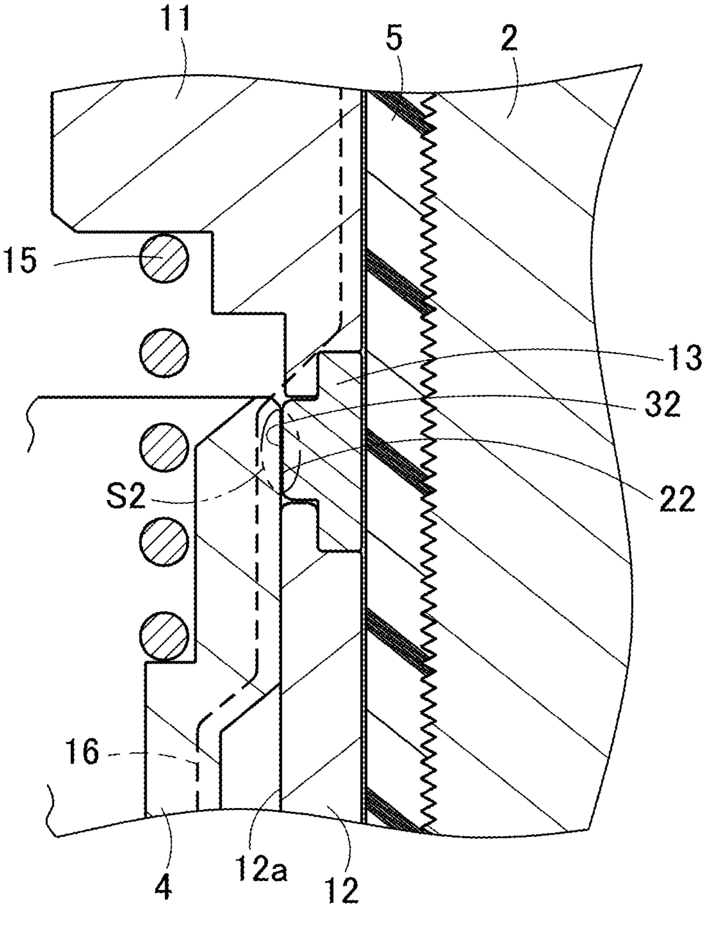
FIG. 3 is an enlarged sectional view of a ring and its vicinity in the solenoid valve of FIG. 1 according to the first embodiment.

FIG. 2 is an enlarged sectional view of the valve seat 14 and its vicinity of the solenoid valve 1 in FIG. 1. FIG. 3 is an enlarged sectional view of the ring 13 and its vicinity of the solenoid valve 1 in FIG. 1. In this embodiment, as shown in FIG. 1 to FIG. 3, a part of an outer periphery of the valve 4 and the body 12 forms the magnetic circuit 16, and the other part of the outer periphery of the valve 4 that does not form the magnetic circuit 16 constitutes the sliding parts 21, 22. Further, in an inner periphery of the bore 12*a* of the body 12, a portion along which the sliding parts 21, 22 of the valve 4 slide constitutes the slid parts 31, 32.

Namely, in this embodiment, as shown in FIG. 1 and FIG. 2, the inner periphery of the bore 12*a* on the lower end portion of the body 12 constitutes a first slid part 31 as shown in FIG. 1 and FIG. 2. Further, an outer periphery of the lower end portion of the valve 4 to slide with the first slid part 31 constitutes a first sliding part 21. As shown in FIG. 2, a part of the outer periphery of the lower end portion of the valve 4 forms the magnetic circuit 16 with the body 12, and the other part of the outer periphery of the lower end portion of the valve 4 that does not form the magnetic circuit 16 constitutes the first sliding part 21, which is supported by the first slid part 31 in a slidable manner. In FIG. 2, an area of the first sliding part 21 and the first slid part 31 is encircled by a chain double-dashed oval S1. In this embodiment, the first slid part 31 is configured by a non-magnetic sleeve 14*b* that is integrally formed with the valve seat 14. This sleeve 14*b* is formed separately from the body 12 in order to make a part of the body 12 non-magnetic, but the sleeve 14*b* constitutes a part of the body 12 in a sense of sliding with the valve 4. In this embodiment, the sleeve 14*b* of the valve seat 14 is coupled with an inside of the lower end portion of the body 12. Then, in this embodiment, the inner periphery of the sleeve 14*b* is slightly projected more toward the valve 4 than the inner periphery of the other part of the body 12, so that the first sliding part 21 of the valve 4 is supported in a slidable manner by the first slid part 31 of the sleeve 14*b*.

On the other hand, in this embodiment, as shown in FIG. 1 and FIG. 3, an inner periphery of the ring 13 corresponding to an upper end portion of the body 12 constitutes a second slid part 32. Further, an outer periphery of an upper end portion of the valve 4 sliding with the second slid part 32 constitutes a second sliding part 22. As shown in FIG. 3, a part of the upper end portion of the valve 4 forms the magnetic circuit 16 with the core body 11. The other part of the outer periphery of the upper end portion of the valve 4 that does not form the magnetic circuit 16 constitutes the second sliding part 22, and this second sliding part 22 is supported by the second slid part 32 in a slidable manner. In FIG. 3, an area of the second sliding part 22 and the second slid part 32 is indicated with a chain double-dashed oval S2. In this embodiment, as shown in FIG. 3, the inner periphery of the ring 13 is slightly projected more toward the valve 4 than the inner periphery of the body 12, and thus the second sliding part 22 of the valve 4 is supported by the second slid part 32 of the ring 13 in a slidable manner.

In this embodiment, exactly, the inner periphery of the bore 12*a* of the body 12 is in contact with the first sliding part 21 and the second sliding part 22 on the outer periphery of the valve 4 only at the first slid part 31 and the second slid part 32, and not in contact with the outer periphery of the valve 4 at any other parts. In other words, in any parts other than the slid parts 31, 32, there is formed a minute clearance between the outer periphery of the valve 4 and the inner periphery of the bore 12*a*.

(Operations and Effects of Solenoid Valve)

According to the configuration of the solenoid valve 1 of the embodiment as explained above, the valve 4 is formed by one component and is housed in the bore 12*a* of the stator core 3 (the body 12) to be placed reciprocally movably in the axial direction in the bore 12*a*. Further, the sliding parts 21, 22 are placed on the outer periphery of the valve 4, and the slid parts 31, 32, which are to slide with the sliding parts 21, 22 of the valve 4 during reciprocal moving of the valve 4, are placed on the inner periphery of the bore 12*a*. Herein, a part of the outer periphery of the valve 4 forms the magnetic circuit 16 with the stator core 3, and the other part of the outer periphery of the valve 4 does not form the magnetic circuit 16 constitutes the sliding parts 21, 22. Accordingly, when the valve 4 reciprocally moves in the bore 12*a* of the stator core 3, the respective sliding parts 21, 22 of the valve 4 slide with the corresponding slid parts 31, 32 in the bore 12*a*. At this time, the side force caused by the magnetic force acting on the valve 4 is made small since the respective sliding parts 21, 22 are placed on the outer periphery of the valve 4 that forms no magnetic circuit 16. Owing to this configuration, in the solenoid valve 1 configured such that the stator core 3 sucks the valve 4 in the axial direction by the magnetic force generated by the coil 2, the sliding resistance caused in association with the reciprocal motion of the valve 4 can be lowered, and the hysteresis in working of the solenoid valve 1 can be effectively reduced.

According to the configuration of this embodiment, the first slid part 31 is formed by the sleeve 14*b* made of non-magnetic material, and thus the magnetic circuit is not formed between the first sliding part 21 and the first slid part 31. Further, the second slid part 32 is formed by the ring 13 made of non-magnetic material, and thus the magnetic circuit is not formed between the second sliding part 22 and the second slid part 32. In other words, the respective sliding parts 21, 22 of the valve 4 slide at non-magnetic portions. Accordingly, the side force caused by the magnetic force acting on the valve 4 is made further small. In this meaning, the hysteresis in working of the solenoid valve 1 can be further effectively reduced.

According to the configuration of this embodiment, the first slid part 31 to slide with the first sliding part 21 of the valve 4 is configured by the non-magnetic sleeve 14*b* that is integrally formed with the valve seat 14, and thus the valve seat 14 is utilized for providing the non-magnetic first slid part 31. Further, the reciprocal motion of the valve 4 with respect to the valve seat 14 is guided by the sleeve 14*b*. Owing to this configuration, the non-magnetic first slid part 31 can be provided without increasing the number of components of the solenoid valve 1, thereby improving the coaxiality accuracy of the valve 4 to the valve seat 14.

According to the configuration of this embodiment, the non-magnetic second slid part 32 is formed by the ring 13 in the stator core 3 (the body 12), and thus there is no magnetic circuit formed between that slid part 32 and the second sliding part 22. Accordingly, the side force caused by the magnetic force acting on the valve 4 is made further small by that amount. Namely, in this embodiment, in both of the first sliding part 21 and the second sliding part 22, the side force caused by the magnetic force acting on the valve 4 is made smaller. In that sense, the hysteresis in working of the solenoid valve 1 can be further effectively reduced.

Figure 4:
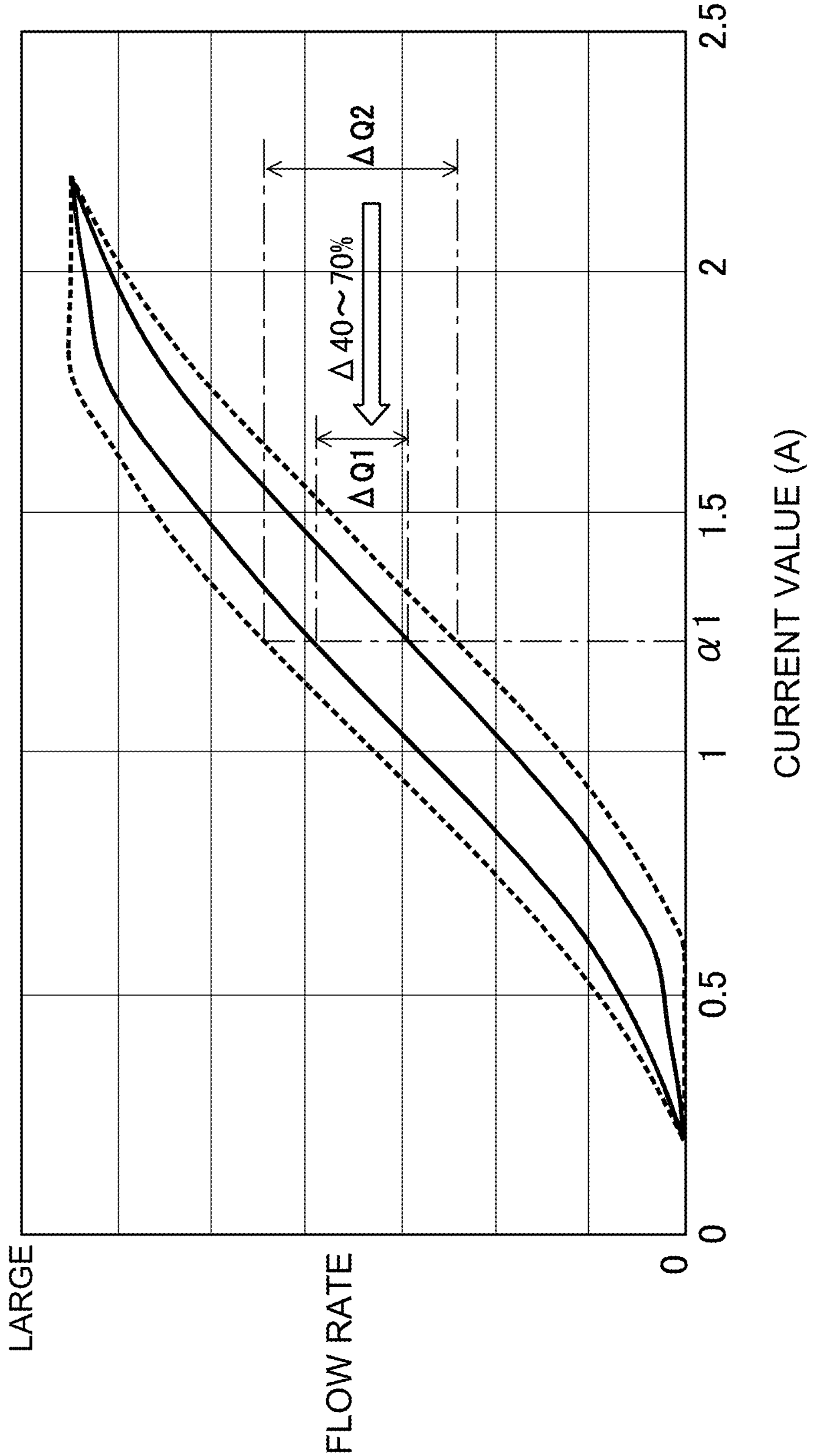
FIG. 4 is a graph showing a relation of a value of current to be energized to a coil and a flow rate of a fluid in the solenoid valve according to the first embodiment.

FIG. 4 is a graph showing a relation of a valve of current energized to the coil 2 and a flow rate of a fluid. A solid line indicates the hysteresis characteristic of the present embodiment, and a broken line indicates the hysteresis characteristic of a comparative example that has no technical feature of the present embodiment. In FIG. 4, changes in the flow rates at a certain current value $\alpha 1$ is compared. A flow rate change $\Delta Q1$ of the present embodiment shows effect of reduction by "40% to 70%" with respect to a flow rate change $\Delta Q2$ of the comparative example.

Second Embodiment

Next, a second embodiment embodying a solenoid valve is explained in detail with reference to the accompanying drawings. In the following explanation, similar or identical parts and components to those of the first embodiment are assigned with the same reference signs as those in the first embodiment and their explanations are omitted, and the explanation is made with a focus on the differences from the first embodiment.

(Sliding Part and Slid Part)

Figure 5:
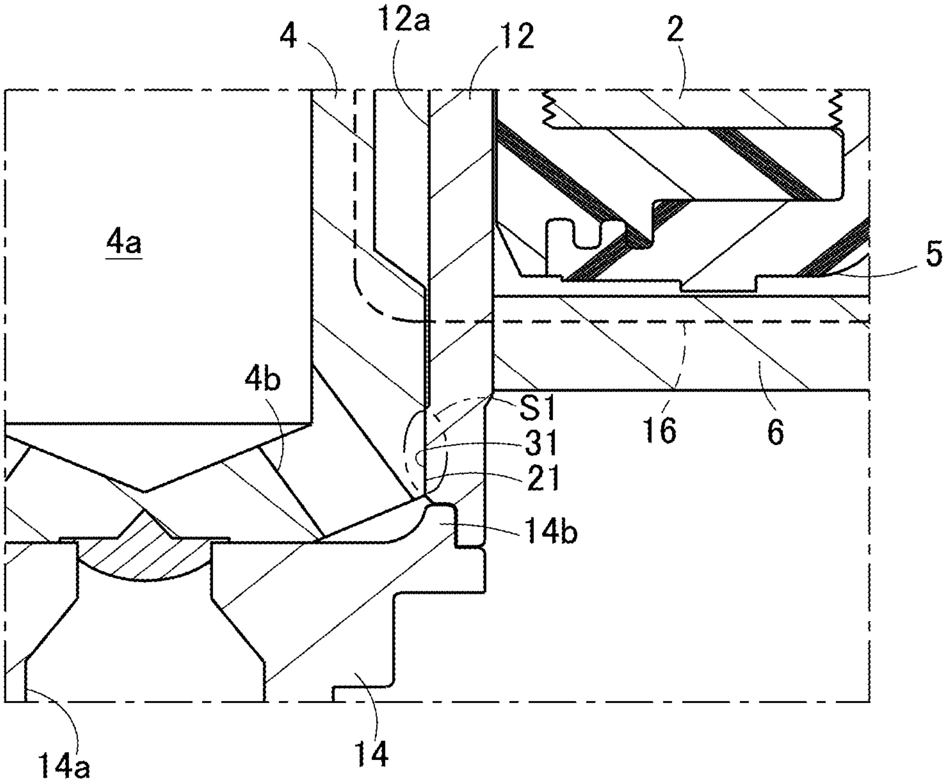
FIG. 5 is a sectional view corresponding to FIG. 2 of the valve seat and its vicinity in the solenoid valve according to a second embodiment.

This embodiment differs from the first embodiment in a configuration of the first slid part 31. FIG. 5 is a sectional view corresponding to FIG. 2, showing the valve seat 14 and its vicinity of the solenoid valve 1. As shown in FIG. 5, in this embodiment, the sleeve 14*b* of the valve seat 14 is made shorter than that of the first embodiment so that the sleeve 14*b* is out of contact with the valve 4. Instead, an inner periphery of the bore 12*a*, along which the first sliding part 21 of the valve 4 forming no magnetic circuit 16 slides, constitutes the first slid part 31. As shown in FIG. 5, a part of the inner periphery of the bore 12*a*, along which the first sliding part 21 on the outer periphery of the valve 4 forming no magnetic circuit 16 slides, is made smaller in its inner diameter than that of the other part of the body 12. Accordingly, that part of the inner periphery projects more toward the valve 4 than the other part of the inner periphery of the body 12 by that amount, and this projecting part constitutes the first slid part 31. Specifically, in this embodiment, the first sliding part 21 and the first slid part 31 are placed between the valve 4 and the body 12, each of which has magnetism.

(Operations and Effects of Solenoid Valve)

According to the configuration of the solenoid valve 1 of this embodiment as explained above, unlike the first embodiment, the first slid part 31 is not placed in a non-magnetic part of the body 12, but placed in a part having less magnetic flux with no formation of the magnetic circuit 16. Namely, the first sliding part 21 of the valve 4 does not slide in the non-magnetic part but slides in a part with less magnetic flux, and by that amount, the side force caused by the magnetic force acting on the valve 4 is made smaller. In that sense, in the solenoid valve 1, the sliding resistance generated in association with the reciprocal motion of the valve 4 can be lowered, and thus the hysteresis in working of the solenoid valve 1 can be effectively reduced.

Third Embodiment

Next, a third embodiment embodying a solenoid valve is explained in detail with reference to the accompanying drawings.

(Sliding Part and Slid Part)

Figure 6:
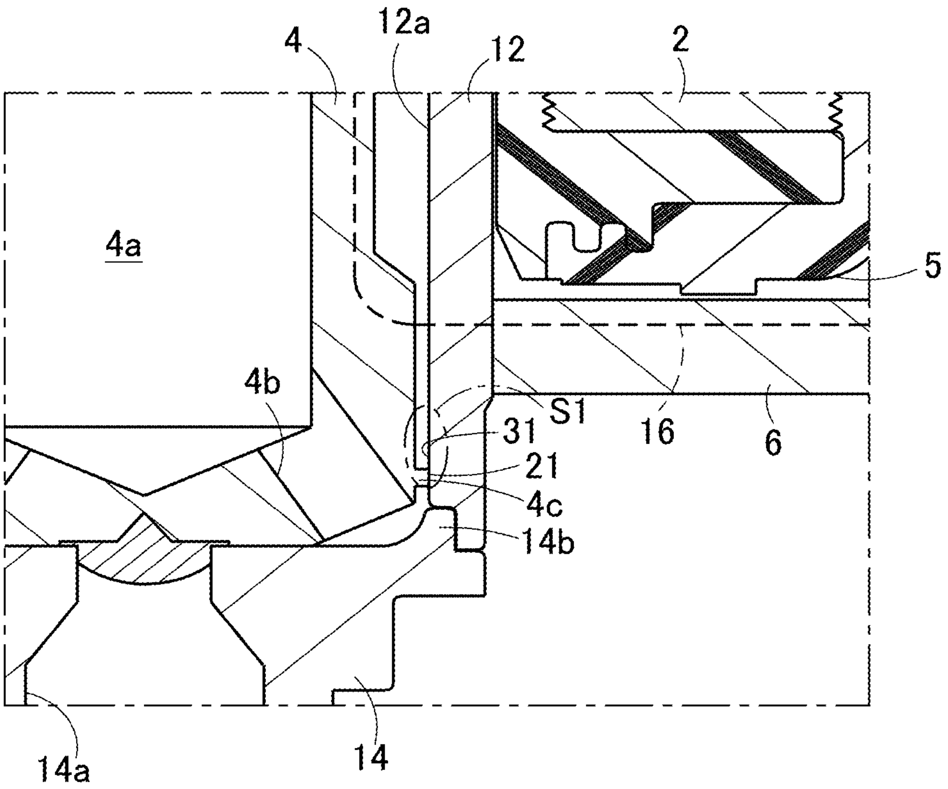
FIG. 6 is a sectional view corresponding to FIG. 2 of the valve seat and its vicinity in the solenoid valve according to a third embodiment.

In this embodiment, a configuration of the first sliding part 21 is different from that of the second embodiment. FIG. 6 is a sectional view corresponding to FIG. 2, showing the valve seat 14 and its vicinity of the solenoid valve 1. As shown in FIG. 6, in this embodiment, the first sliding part 21 on the outer periphery of the valve 4 with no formation of the magnetic circuit 16 is configured by a protruding portion 4*c* protruding toward the first slid part 31. This protruding portion 4*c* is integrally formed with the valve 4. Further, the inner periphery of the bore 12*a* to be in contact with this protruding portion 4*c* constitutes the first slid part 31. In this embodiment, as shown in FIG. 6, a part of the inner periphery of the bore 12*a*, along which the first sliding part 21 (the protruding portion 4*c*) on the outer periphery of the valve 4 with no formation of the magnetic circuit 16 slides, has an inner diameter equal to an inner diameter of the other part of the body 12.

(Operations and Effects of Solenoid Valve)

According to a configuration of the solenoid valve 1 of this embodiment as mentioned above, the first sliding part 21 is constituted by the protruding portion 4*c*, and thus a contact area of the first sliding part 21 to be in contact with the first slid part 31 is less than that of the second embodiment. Accordingly, as for the solenoid valve 1, the sliding resistance of the valve 4 can be further lowered, and thus the hysteresis in working of the solenoid valve 1 can be effectively reduced.

Fourth Embodiment

Next, a fourth embodiment embodying a solenoid valve is explained in detail with reference to the accompanying drawings.

(Sliding Part and Slid Part)

Figure 7:
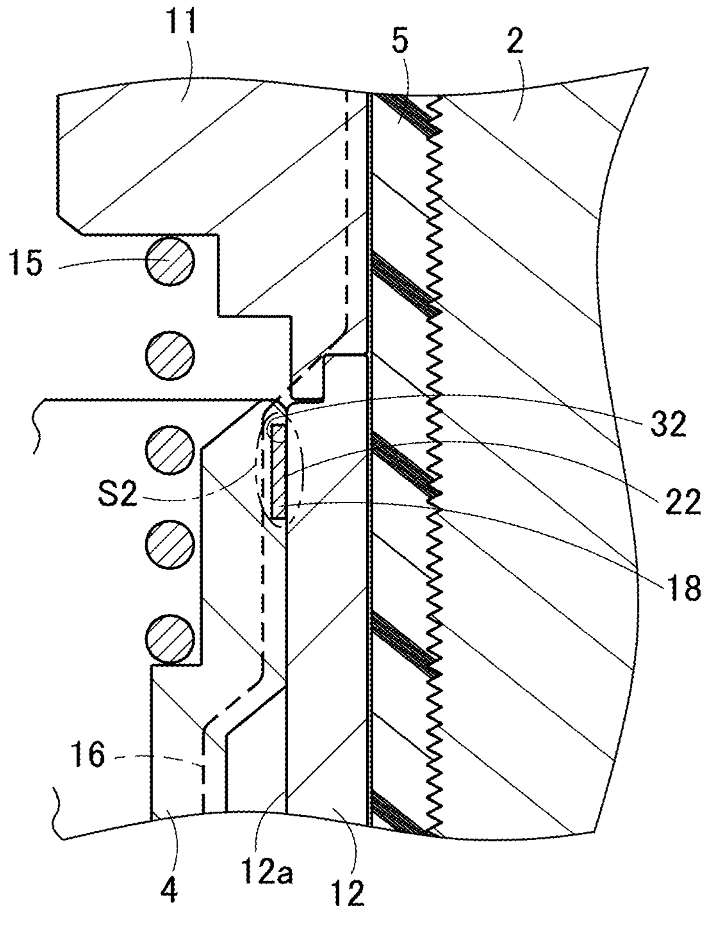
FIG. 7 is a sectional view corresponding to FIG. 3 of the ring and its vicinity in the solenoid valve according to a fourth embodiment.

In this embodiment, a configuration of the second sliding part 22 is different from that of the first embodiment. FIG. 7 is a sectional view corresponding to FIG. 3, showing a ring 18 and its vicinity of the solenoid valve 1. As shown in FIG. 7, in this embodiment, the second sliding part 22 on the outer periphery of the valve 4 with no formation of the magnetic circuit 16 is configured by the non-magnetic ring 18 that is formed separately from the valve 4.

(Operations and Effects of Solenoid Valve)

According to the configuration of the solenoid valve 1 of this embodiment explained above, the second sliding part 22 is configured by the non-magnetic ring 18 formed separately from the valve unlike the first embodiment, and thus there is no magnetic circuit formed between the second sliding part 22 and the second slid part 32. Accordingly, the side force caused by the magnetic force acting on the valve 4 is made further smaller, and thus the hysteresis in working of the solenoid valve 1 can be further effectively reduced.

Fifth Embodiment

Next, a fifth embodiment embodying a solenoid valve is explained in detail with reference to the accompanying drawings.

(Sliding Part and Slid Part)

Figure 8:
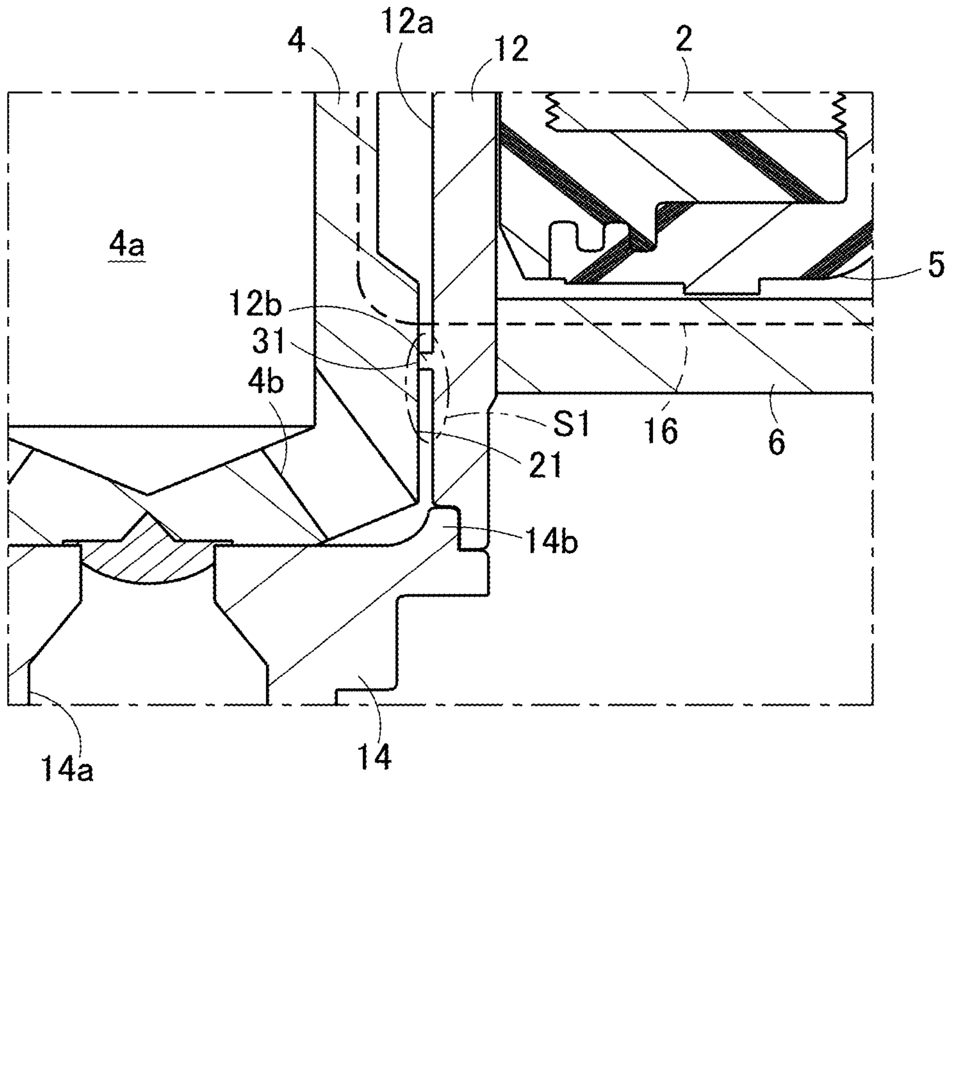
FIG. 8 is a sectional view corresponding to FIG. 6 of the valve seat and its vicinity in the solenoid valve according to a fifth embodiment.

In this embodiment, a configuration of the first sliding part 21 is different from that of the third embodiment. FIG. 8 is a sectional view corresponding to FIG. 6, showing the valve seat 14 and its vicinity of the solenoid valve 1. As shown in FIG. 8, in this embodiment, the first slid part 31 corresponding to the first sliding part 21 on the outer periphery of the valve 4 with formation of no magnetic circuit 16 is configured by a protruding portion 12*b* protruding toward the first sliding part 21. This protruding portion 12*b* is integrally formed with the body 12. Then, the outer periphery of the valve 4 that is to be in contact with the protruding portion 12*b* constitutes the first sliding part 21.

(Operations and Effects of Solenoid Valve)

According to the configuration of the solenoid valve 1 of this embodiment as explained above, the same operations and effects with the third embodiment can be achieved. In other words, the first slid part 31 is configured by the protruding portion 12*b*, and thus the contact area of the first slid part 31 to be in contact with the first sliding part 21 becomes small. Accordingly, in the solenoid valve 1, the sliding resistance of the valve 4 can be further lowered, and thus the hysteresis in working of the solenoid valve 1 can be further effectively reduced.

Other Embodiments

This disclosed technique is not limited to the above-mentioned respective embodiments, and may be embodied by appropriately modifying a part of the configuration without departing from the scope of the disclosed technique.

(1) In the above-mentioned respective embodiments, the stator core 3 is configured with a plurality of components, i.e., the core body 11, the body 12, and the ring 13, but alternatively, the stator core may be configured with one component.

(2) In the above-mentioned third embodiment, the first sliding part 21 of the valve 4 is configured by the protruding portion 4*c* that is made of magnetic material and formed integrally with the valve 4, but alternatively, this protruding portion may be configured non-magnetically.

INDUSTRIAL APPLICABILITY

This disclosed technique may be utilized for a solenoid valve of a linear solenoid type that is used for controlling a fluid flow rate.

REFERENCE SIGNS LIST

1 Solenoid valve
2 Coil
3 Stator core
4 Valve
4*c* Protruding portion
12*a* Bore
12*b* Protruding portion
13 Ring
14 Valve seat
14*b* Sleeve
16 Magnetic circuit
18 Ring
21 First sliding part
22 Second sliding part
31 First slid part
32 Second slid part

The invention claimed is:

1. A solenoid valve comprising:

a coil configured to generate a magnetic force upon being energized;

a stator core provided with the coil on an outside and a bore on an inside;

a valve that is placed reciprocally movably in an axial direction in the bore, an outer periphery of the valve having a sliding part; and a slid part that is placed on an inner periphery of the bore and is configured to slide relative to the sliding part of the valve when the valve reciprocally moves, the solenoid valve being configured that the stator core urges the valve in the axial direction by the magnetic force generated by the coil to reciprocally move the valve, wherein a part of the outer periphery of the valve forms a magnetic circuit with the stator core, and another part of the outer periphery of the valve, which forms no magnetic circuit, constitutes the sliding part;

the valve includes one end portion on one side in the axial direction, and the sliding part not forming the magnetic circuit is placed on an outer periphery of the one end portion;

the valve includes another end portion on another side in the axial direction, and the sliding part not forming the magnetic circuit is placed on an outer periphery of the other end portion;

the solenoid valve further includes a valve seat, on which the valve is to be seated, the valve seat being placed at a position facing the one end portion of the valve in the axial direction;

the valve seat includes a valve hole extending in the axial direction, and is configured such that, when the valve is seated on the valve seat, the valve hole is closed; and the slid part is configured by a non-magnetic sleeve that extends in the axial direction and is formed integrally with the valve seat, and configured by a ring made of non-magnetic material and formed separately from the stator core;

the stator core is made of magnetic material and includes a core body and a tubular body extending coaxially from the core body to one side in the axial direction;

an inner periphery of the ring projects toward the valve farther than an inner periphery of the tubular body;

an inner periphery of the sleeve projects toward the valve farther than the inner periphery of the tubular body; and the ring is between the core body and the tubular body in the axial direction.

* * * * *